United States Patent

[11] 3,592,545

[72] Inventors  T. O. Paine
Administrator of the National Aeronautics and Space Administration with respect to an invention of;
Robert H. Silver, 1217 N. Berendo St. Los Angeles, Calif.
[21] Appl. No. 865,909
[22] Filed Oct. 13, 1969
[45] Patented July 13, 1971

[54] APPARATUS FOR REMOTE MEASUREMENT OF DISPLACEMENT OF MARKS ON A SPECIMEN UNDERGOING A TENSILE TEST
3 Claims, 1 Drawing Fig.
[52] U.S. Cl. .................................................. 356/32, 33/125, 73/95, 356/167, 250/235
[51] Int. Cl. ...................................................... G01b 11/16, G01n 3/08
[50] Field of Search ................................................ 356/32, 167, 170, 172; 73/88, 95; 33/125; 250/235

[56] References Cited
UNITED STATES PATENTS

| 3,164,008 | 1/1965 | Nielsen | 356/32 |
| 3,421,819 | 1/1969 | Anderson et al. | 356/32 |
| 3,435,231 | 3/1969 | Griffiths et al. | 356/32 |
| 3,439,532 | 4/1969 | Grumbach et al. | 73/95 |
| 3,454,776 | 7/1969 | Hock | 356/172 |

FOREIGN PATENTS

| 1,379,351 | 1964 | France | 33/125 (O) |
| 684,435 | 1952 | Great Britain | 356/170 |

Primary Examiner—Ronald L. Wibert
Assistant Examiner—J. Rothenberg
Attorneys—J. H. Warden, Monte F. Mott and G. T. McCoy ABSTRACT: Apparatus is disclosed for measuring displacement of marks on a specimen undergoing a tensile test comprising means for illuminating the field of marks, means for scanning the illuminated field with an oscillating mirror, or the like, a photosensitive detector, and means for recording in analog or digital form the time between detecting marks as the specimen undergoing testing is continuously scanned.

PATENTED JUL 13 1971 3,592,545
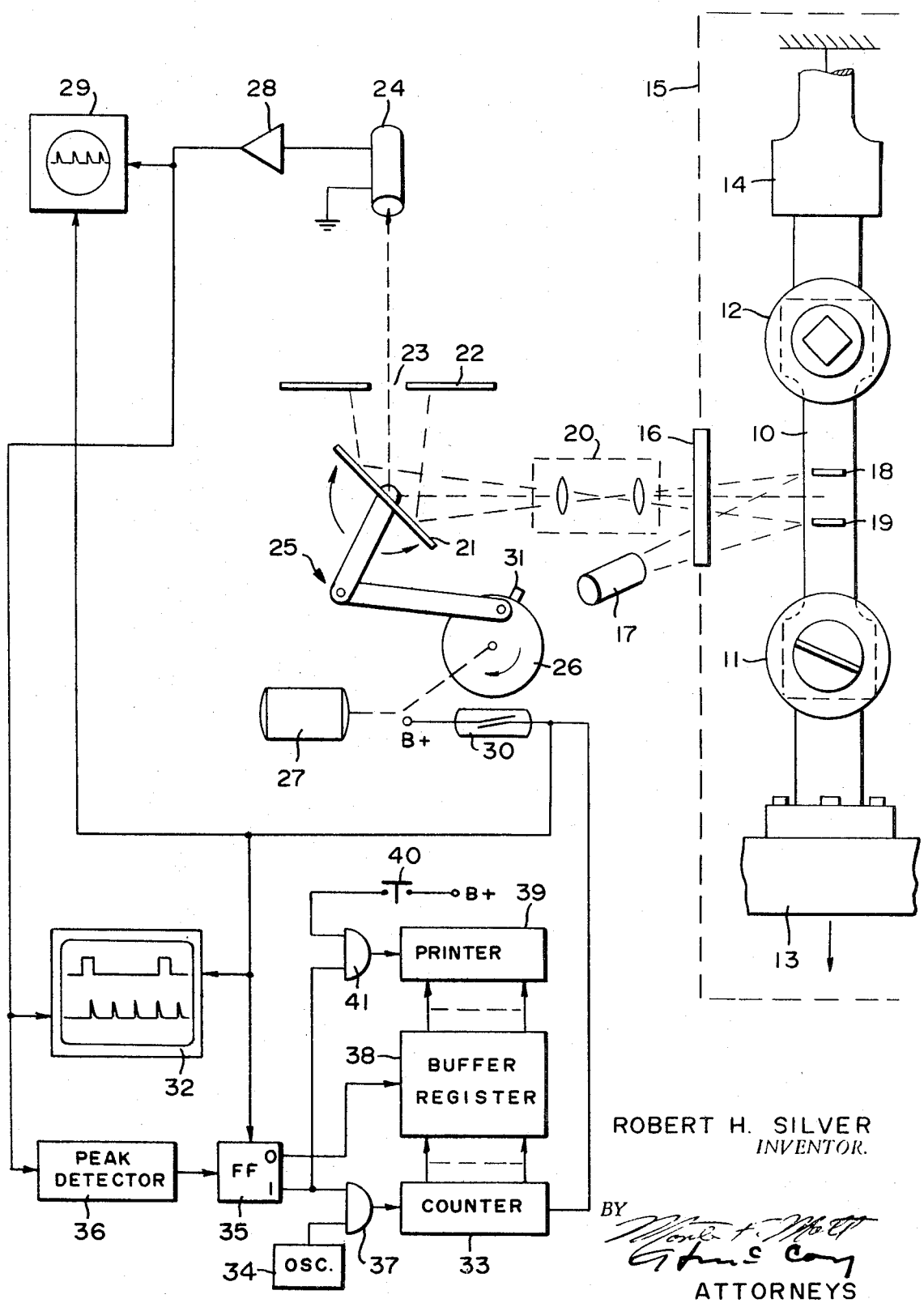
ROBERT H. SILVER
INVENTOR.
BY
ATTORNEYS

APPARATUS FOR REMOTE MEASUREMENT OF DISPLACEMENT OF MARKS ON A SPECIMEN UNDERGOING A TENSILE TEST

ORIGIN OF THE INVENTION

The invention described herein was made in the performance of work under a NASA contract and is subject to the provisions of Section 305 of the National Aeronautics and Space Act of 1958, Public Law 85–568 (72 Stat. 435; 42 USC 2457).

BACKGROUND OF THE INVENTION

This invention relates to extensometers, and more generally to a method and apparatus for remotely measuring displacement of a given mark or marks on a specimen undergoing a tensile test.

Remote measurement of deformation or displacement of a specimen is often desirable, and for any type of environmental chamber testing, remote measuring capability is essential. Systems available for such measurements have been essentially servosystems set up to observe targets on the specimen and maintain alignment of their optical systems with the targets.

The performance of electro-optical servosystems is generally quite satisfactory, particularly when both accuracy and speed are desired, but they are generally quite expensive. What is often desired is a less expensive system for remote measurement of deformation or displacement without significant degradation of accuracy and speed.

SUMMARY OF THE INVENTION

In accordance with the present invention, one or more optically contrasting marks are placed on a test specimen and illuminated while the specimen undergoes testing. The field of the mark or marks, which may include a stationary reference mark, is scanned with an optical system to detect the mark or marks and generate an electrical pulse in response to each mark scanned. The position of each pulse with respect to a reference is then determined graphically or electronically to measure displacement of a given mark.

BRIEF DESCRIPTION OF THE DRAWINGS

The sole FIGURE of the drawing shows a preferred embodiment of the present invention with apparatus for both graphically and electronically determining displacement of one mark with respect to another mark on a specimen.

DESCRIPTION OF THE PREFERRED EMBODIMENT

Referring now to the drawing, a specimen 10 undergoing tensile strain testing is gripped at one end by a conventional device 11 and at the other end by a similar device 12. The gripping devices 11 and 12 are rigidly connected to a moveable crosshead 13 and a crosshead extension 14, respectively, of a tensile testing machine. The crosshead extension 14 is usually connected to a stationary crosshead by a load cell (not shown) in order that the tension being applied to the specimen 10 may be readily determined as the crosshead 13 is moved downwardly, usually with tension screws at each end of the crosshead 13.

The apparatus thus far described is conventional and serves only to provide an environment for the illustrative embodiment of the present invention. Other environments may be provided for other types of tests involving displacement or other movement of specimens or parts. An environment may include particular conditions such as a vacuum, and extreme temperature, maintained in a suitable chamber, represented in the drawing by a dotted line box 15, with a window 16 made of a material having suitable transmission properties for light from an illuminating source 17 directed at the specimen 10. Two marks 18 and 19 are placed on the specimen, preferably in the form of narrow strips of material selected to provide good optical contrast with the specimen.

The illustrated embodiment of the present invention provides for remote measurement of the length between the marks 18 and 19. As tension is increased, the change in length $\Delta L$ from the original length $L_0$ can be readily determined to provide strain ($\Delta L/L_0$) data. In other embodiments or applications, the present invention may provide for remote measurement of the length between more than two marks, such as to determine strain in different parts of a nonhomogeneous specimen, or of the displacement of one or more marks from a stationary mark. The number and arrangement of marks may be varied for the different applications; all that is required is an arrangement of the marks along a predetermined scanning line. That line is, of course, selected to be in the direction of interest with respect to change in length or displacement.

In the present embodiment, the specimen 10 is electromechanically scanned along the length of the specimen. That is accomplished by a lens system 20, an oscillating mirror 21, an opaque plate 22 with a slit 23, and a light-sensitive device 24 such as a photoconductive cell having suitable sensitivity for light from the source 17, and suitable response time for the particular application and operating requirements. The lens system is conventional and merely serves to project the field of marks being viewed through the window 16 onto the mirror 21. The mirror 21 is a front-face reflecting mirror in order to avoid variations in the signal output of the device 24 due to refraction and dispersion of light through a glass plate of a backface reflecting mirror. Its function is to cyclically shift the field of marks past the slit 23. Accordingly, the mirror is caused to oscillate by a linkage 25 eccentrically driven by a disc 26 that is rotated at a constant speed by a suitable constant-speed motor 27.

The oscillating-mirror system may be replaced by a rotating-prism system which will cyclically shift the field of marks past the slit 23 at a constant angular velocity by rotating it through 360° at a constant speed through a suitable gear train. However, a constant angular velocity is not essential as long as the period of each scanning cycle is maintained constant and the marks are in the central portion of the scanning arc which may be 10° to 120°. Accordingly, if a prism is used, it may also be oscillated for field scanning. Alternatively, a photosensitive device may be moved back and forth to directly scan the field.

As the field of marks is scanned, the light-sensitive device 24 produces an electrical signal that is amplified through a suitable amplifier 28 and displayed on the face of a cathode-ray tube, such as an externally synchronized oscilloscope 29. An external sync signal is generated by the scanning system, such as by a reed switch 30 actuated by a small magnet 31 on the disc 26. The leading edge of each sync pulse produced by actuation of the reed switch is then employed to initiate a new horizontal sweep cycle. In that manner two sets of mark pulses are displayed during each cycle of the field-scanning cycle, one set for the pair of marks 18 and 19 in one order and another set for the pair of marks in the reverse order. A photographic record may be made of different display cycles for later analyses.

Since the time or distance between peaks of paired pulses displayed is related to actual distance between the marks 18 and 19, strain for a given load cell reading may be quickly computed from the original distance between peaks measured with a load cell reading of zero. If more than two marks are provided, such as for a nonhomogeneous specimen, the strain of the specimen between different pairs of marks may be determined for a given load cell reading.

The prior art systems employed for the same application would require for each pair of marks one servosystem for each mark and a differential amplifier connected to the feedback loops of the two servosystems. The present invention thus has an advantage of cost. Another advantage over the prior art is that a record for all pairs is made simultaneously on one sweep of the oscilloscope 29, or channel of strip-chart recorder 32, without need for multiplexing.

The strip-chart recorder 32 is conventional and may have two channels, one for recording the output of the amplifier 28 and one for recording the output of the reed switch 30. However, a single recording channel may be readily employed by combining the two signals through a suitable summing amplifier at the input of the one recording channel.

Digital techniques for recording data may also be employed by providing a counter 33 to count clock pulses from a stable oscillator 34 under control of a T-type flip-flop 35. The pulse output of the reed switch 30 directly resets the flip-flop 35 to start a scanning cycle. The peak of the first mark pulse from the amplifier 28 is detected by a conventional peak detector 36 to set the flip-flop 35 and enable a gate 37 to transmit clock pulses. The next mark pulse resets the flip-flop 35 to terminate the counting cycle and cause the contents of the counter 33 to be transferred (read into) a buffer register 38 (register of D-type flip-flops). The sequence is repeated as the marks are scanned in the reverse direction for a given scanning cycle.

The contents of the buffer register may be printed out through a conventional printer 39 in response to a suitable print command, such as by manual actuation of pushbutton switch 40. To assure that a printout cycle is not initiated while the contents of the buffer register are changing, an AND gate 41 is provided to enable a print signal to be transmitted to the printer 39 only while the counter 33 is counting. To immediately free the buffer register, the printer 39 may be provided with its own input register which will respond to the leading edge of the print signal transmitted thereto.

For an automated testing system in which the test load is increased incrementally in uniform steps, the switch 40 may be replaced with a signal from the load control system signifying a new load condition has been reached. A separate counter could then be provided to count the load increments and also be connected to the printer for direct identification of recorded data. But in the usual application, the operator may manually increase the load, then actuate the switch 40 after allowing enough time for one field-scanning cycle. Once printout has been effected, the operator may manually enter the load corresponding to the number printed out. If a number corresponding to a zero load condition is initially printed out, strain can be computed directly from the numbers printed out as long as the frequency of the oscillator 34 remains constant. Any drift of frequency will produce an error proportional thereto.

Although a preferred embodiment of the invention has been described with reference to an extensometer application for strain measurements of a specimen using only two marks, it should be understood that it includes the use of more than two marks and other arrangements for displacement measurements in general; it is simply necessary to provide the reference mark or marks from which displacement is to be determined in the field being scanned.

All of the techniques for data display and recording illustrated for the extensometer application are useful in other applications. It should also be understood that the technique illustrated for providing field scan synchronizing signals may be replaced by other suitable techniques, depending upon the application. For example, if only the strip-chart recorder is to be employed, the end marks of any pair or group may be readily distinguished by leading and trailing half marks which will cause distinct low-amplitude pulses to be recorded before and after the end marks. To distinguish the direction of scanning two half marks may be used at one end of the group.

It is also to be understood that many marking arrangements and techniques are applicable. For example, a mark may be simply a boundary between a light and dark area. All that is required is that the "mark" cause a distinguishable change in the output signal of the photosensitive device, and a step change caused by scanning from a light to a dark area, and vice versa, may be easily recorded and recognized. Accordingly, inasmuch as modifications and variations falling within the spirit of the invention will occur to those skilled in the art, it is not intended that the scope of the invention be determined by the embodiment illustrated, but rather by the appended claims.

What I claim is:

1. Apparatus for measuring the relative displacement between at least two visual marks on a given side of a specimen undergoing a tensile test, said mark being in the form of a narrow strip, comprising:

a stationary opaque plate having a slit of substantially the same shape as said marks;

means for illuminating said specimen on said side intended for viewing;

means independent of said illuminating means for viewing said specimen on said side and for forming an optical image of a substantial portion of said side bearing said mark;

means for reflecting said image onto said plate with the image marks parallel to said slit;

means for cyclically driving said reflecting means to cyclically shift said image past said slit;

a light-sensitive device behind said plate positioned to receive light through said slit; and means responsive to said light-sensitive device for displaying an electrical signal proportional to the intensity of light being received through said slit.

2. Apparatus as defined in claim 1 wherein said means for driving said reflecting means operates in an oscillatory manner whereby a given point in said image sweeps by said slit twice during each cycle.

3. Apparatus as defined in claim 1 wherein said means for cyclically driving said reflecting means includes means for generating a cycle-timing signal to indicate a reference instant of time in each cycle of operation, and said display means includes means for displaying said cycle-timing signal with said electrical signal.